(12) United States Patent
Nukada et al.

(10) Patent No.: US 10,597,505 B2
(45) Date of Patent: Mar. 24, 2020

(54) POLYIMIDE PRECURSOR SOLUTION AND POLYIMIDE FILM

(71) Applicant: FUJI XEROX CO., LTD., Tokyo (JP)

(72) Inventors: Katsumi Nukada, Kanagawa (JP); Tomoya Sasaki, Kanagawa (JP); Takashi Imai, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 0 days.

(21) Appl. No.: 15/718,122

(22) Filed: Sep. 28, 2017

(65) Prior Publication Data

US 2018/0244886 A1    Aug. 30, 2018

(30) Foreign Application Priority Data

Feb. 24, 2017  (JP) .................. 2017-033923

(51) Int. Cl.
| | | |
|---|---|---|
| *C08J 9/26* | (2006.01) | |
| *C09D 179/08* | (2006.01) | |
| *C08F 220/14* | (2006.01) | |
| *C08F 212/08* | (2006.01) | |
| *C08J 5/18* | (2006.01) | |
| *C09D 125/14* | (2006.01) | |
| *C08G 73/10* | (2006.01) | |

(52) U.S. Cl.
CPC ............ *C08J 9/26* (2013.01); *C08F 212/08* (2013.01); *C08F 220/14* (2013.01); *C08G 73/105* (2013.01); *C08G 73/1067* (2013.01); *C08G 73/1071* (2013.01); *C08J 5/18* (2013.01); *C09D 125/14* (2013.01); *C09D 179/08* (2013.01); *C08J 2379/08* (2013.01)

(58) Field of Classification Search
CPC ........................................................ C08J 9/26
See application file for complete search history.

(56) References Cited

U.S. PATENT DOCUMENTS

2016/0111695 A1* 4/2016 Kanamura ............ H01M 2/145
                                                  29/623.1

FOREIGN PATENT DOCUMENTS

| JP | 10-302749 A | 11/1998 |
|---|---|---|
| JP | 2008-34212 A | 2/2008 |
| JP | 2010-24385 A | 2/2010 |
| JP | 2011-111470 A | 6/2011 |
| JP | 2012-107144 A | 6/2012 |
| JP | 5331627 B2 | 10/2013 |
| JP | 2016-183333 A | 10/2016 |
| WO | 2014/196656 A1 | 12/2014 |

\* cited by examiner

*Primary Examiner* — Arrie L Reuther
(74) *Attorney, Agent, or Firm* — Sughrue Mion, PLLC

(57) ABSTRACT

A polyimide precursor solution contains resin particles and a polyimide precursor. The resin particles in the polyimide precursor solution have a volume particle size distribution with one or more peaks. The volume frequency of a peak having the highest volume frequency of the one or more peaks accounts for 90% to 100% of the total volume frequency of all peaks of the volume particle size distribution.

18 Claims, 1 Drawing Sheet

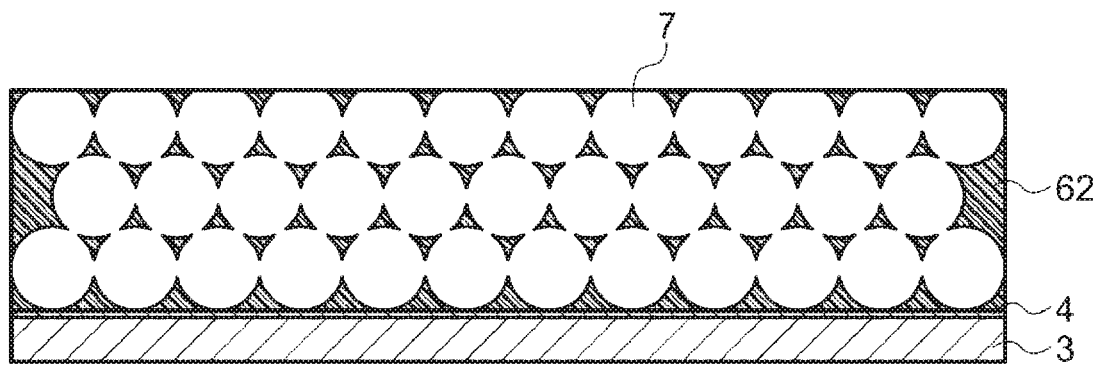

POLYIMIDE PRECURSOR SOLUTION AND POLYIMIDE FILM

CROSS-REFERENCE TO RELATED APPLICATIONS

This application is based on and claims priority under 35 USC 119 from Japanese Patent Application No. 2017-033923 filed Feb. 24, 2017.

BACKGROUND (i) Technical Field

The present invention relates to polyimide precursor solutions and polyimide films.

(ii) Related Art

Polyimide resins have high mechanical strength, high chemical stability, and high heat resistance. Accordingly, porous polyimide films, having such properties, have received much attention.

In a polyimide precursor solution containing resin particles and a polyimide precursor, the resin particles may aggregate and exhibit low dispersibility. It has been found, for example, that a porous polyimide film formed from a polyimide precursor solution containing aggregated resin particles has pinholes (i.e., through-holes extending from the front surface to the back surface).

SUMMARY

According to an aspect of the invention, there is provided a polyimide precursor solution containing resin particles and a polyimide precursor. The resin particles in the polyimide precursor solution have a volume particle size distribution with one or more peaks. The volume frequency of a peak having the highest volume frequency of the one or more peaks accounts for 90% to 100% of the total volume frequency of all peaks of the volume particle size distribution.

BRIEF DESCRIPTION OF THE DRAWINGS

Exemplary embodiments of the present invention will be described in detail based on the following FIGURE, wherein:

the FIGURE is a schematic view illustrating the structure of a porous polyimide film formed from a polyimide precursor solution according to an exemplary embodiment.

DETAILED DESCRIPTION

Exemplary embodiments of the present invention will now be described.

Polyimide Precursor Solution and Method of Manufacture Thereof

A polyimide precursor solution according to a first exemplary embodiment contains resin particles and a polyimide precursor. The resin particles in the polyimide precursor solution have a volume particle size distribution with one or more peaks. The volume frequency of a peak having the highest volume frequency of the one or more peaks accounts for 90% to 100% of the total volume frequency of all peaks of the volume particle size distribution.

A polyimide precursor solution according to a second exemplary embodiment contains an aqueous solvent containing water (which may be hereinafter simply referred to as "aqueous solvent"), resin particles that are insoluble in the aqueous solvent containing water and that have surface acidic groups (which may be hereinafter simply referred to as "resin particles having surface acidic groups"), an organic amine compound, and a polyimide precursor.

A method for manufacturing the polyimide precursor solution according to this exemplary embodiment includes polymerizing a tetracarboxylic dianhydride and a diamine compound in a dispersion of resin particles having surface acidic groups in an aqueous solvent containing water in the presence of an organic amine compound to form a polyimide precursor.

As used herein, the term "this exemplary embodiment" refers to any exemplary embodiment including features common to the first and second exemplary embodiments.

As used herein, the term "insoluble" means that the objective substance is soluble in the objective liquid at 25° C. in an amount of 3% by mass or less.

Polyimide films are obtained, for example, by applying a solution of a polyimide precursor in an organic solvent (e.g., a solution of a polyimide precursor in a highly polar organic solvent such as N-methylpyrrolidone (which may be hereinafter referred to as "NMP") or N,N-dimethylacetamide (which may be hereinafter referred to as "DMAc") and then heating and forming the coating.

Polyimide films may contain particles such as inorganic particles or resin particles depending on the purpose. Such films are formed from polyimide precursor solutions mixed with particles. For example, if a solution of a polyimide precursor in a highly polar organic solvent is mixed with inorganic particles to prepare a particle-dispersed polyimide precursor solution, the inorganic particles in the polyimide precursor solution exhibit low dispersibility.

On the other hand, if a solution of a polyimide precursor in a highly polar organic solvent is mixed with common resin particles (e.g., polystyrene resin particles), the resin particles in the polyimide precursor solution may dissolve into the highly polar organic solvent and may thus exhibit low dispersibility. If, for example, resin particles that are poorly soluble in highly polar organic solvents are prepared by a technique such as emulsification polymerization, the solvent may be replaced with a highly polar organic solvent before mixing with a solution of a polyimide precursor in a highly polar organic solvent. In this case, the resin particles may be collected from the resin particle dispersion in order to replace the solvent with a highly polar organic solvent. The collected resin particles may aggregate and exhibit low dispersibility. If resin particles having no surface acidic groups are dispersed in a solution of a polyimide precursor in an aqueous solvent, the resin particles may exhibit low dispersibility, depending on the particle size and concentration of the resin particles. This is because a large amount of a basic substance such as an organic amine compound needs to be added to form a salt with the polyimide precursor so that the polyimide precursor dissolves into the aqueous solvent.

It has been found, for example, that a porous polyimide film formed from a polyimide precursor solution containing aggregated resin particles has pinholes.

As used herein, the term "pinhole" is distinguished from the term "pore", which refers to a void formed by removing a resin particle. The term "pinhole" refers to a through-hole extending from the front surface to the back surface. Specifically, pinholes have a size of 0.1 to 0.5 mm, which is noticeably larger than the particle size of the resin particles used, and are visually identifiable.

In contrast to such films, a porous polyimide film formed from the polyimide precursor solution according to this exemplary embodiment may have reduced pinholes. Although the mechanism is not fully understood, one possible explanation is given below.

The resin particles in the polyimide precursor solution according to the first exemplary embodiment have a volume particle size distribution with one or more peaks. The volume frequency of a peak having the highest volume frequency of the one or more peaks (which may be hereinafter referred to as "peak A") accounts for 90% to 100% of the total volume frequency of all peaks of the volume particle size distribution.

In other words, the total volume frequency of the peaks other than the peak A of the particle size distribution of the resin particles in the polyimide precursor solution according to the first exemplary embodiment accounts for less than 10% of the total volume frequency of all peaks of the volume particle size distribution. This indicates that the resin particles in the polyimide precursor solution according to the first exemplary embodiment may have good dispersibility. Because of the good dispersibility of the resin particles in the polyimide precursor solution, the resin particles may be readily and nearly uniformly dispersible in a coating. As the solvent evaporates during film formation, the resin particles will be more prone to aggregation and will therefore be more likely to form visually identifiable aggregates after film formation. Accordingly, the use of a polyimide precursor solution containing resin particles with good dispersibility may provide a porous polyimide film with reduced pinholes.

The polyimide precursor solution according to the second exemplary embodiment, as described above, contains resin particles having surface acidic groups. The acidic groups present on the surfaces of the resin particles may function as a dispersant for the resin particles by forming a salt with a base such as the organic amine compound used to dissolve the polyimide precursor into the aqueous solvent. This may improve the dispersibility of the resin particles in the polyimide precursor solution. The use of such a polyimide precursor solution containing well-dispersed resin particles may provide a porous polyimide film with reduced pinholes.

As discussed above, the use of the polyimide precursor solution according to this exemplary embodiment, having the composition described above, may provide a porous polyimide film with reduced pinholes.

In the method for manufacturing the polyimide precursor solution according to this exemplary embodiment, a polyimide precursor is formed in a resin particle dispersion prepared in advance. This method may allow the preparation of the polyimide precursor solution according to this exemplary embodiment within a single system (e.g., within a single vessel) throughout the process from the preparation of the resin particle dispersion to the preparation of the polyimide precursor solution, which may simplify the process of manufacturing the polyimide precursor solution. In addition, the resin particles may be handled without being dried or collected, which may avoid aggregation during drying.

A polyimide precursor solution obtained by the method for manufacturing a polyimide precursor solution containing resin particles having surface acidic groups according to this exemplary embodiment may contain resin particles with improved dispersibility. A resin-particle containing polyimide film formed from such a polyimide precursor solution may have a resin particle distribution with reduced variation.

A method for manufacturing a porous polyimide film according to this exemplary embodiment includes a first step of forming a coating of the polyimide precursor solution according to this exemplary embodiment and drying the coating to form a film and a second step of heating the coating to imidize the polyimide precursor. In the second step, resin particle removal treatment is performed to obtain a porous polyimide film according to this exemplary embodiment. A porous polyimide film obtained by this method of manufacture may have a pore distribution with reduced variation and may also have reduced variation in, for example, pore shape and size. One possible explanation is given below.

Since the polyimide precursor solution according to this exemplary embodiment may contain resin particles with improved dispersibility, a porous polyimide film obtained by removing the resin particles may have a pore distribution with reduced variation.

In addition, the use of resin particles may result in reduced variation in, for example, pore shape and size. This is probably because the use of resin particles effectively contributes to the relaxation of residual stress resulting from volume shrinkage during the step of imidizing the polyimide precursor.

The polyimide precursor solution has a boiling point of 100° C. since the polyimide precursor is dissolved in an aqueous solvent. As a film containing the polyimide precursor and the resin particles is heated, the solvent evaporates quickly before an imidization reaction proceeds. The film loses its flowability and becomes insoluble in organic solvents before the resin particles in the film start deforming thermally. The pore shape may thus be maintained.

The porous polyimide film according to this exemplary embodiment, which is obtained by forming a resin-particle containing polyimide film from the polyimide precursor solution according to this exemplary embodiment and removing the resin particles, may have reduced cracks. This is probably because the use of resin particles in the method for manufacturing a porous polyimide film according to this exemplary embodiment contributes effectively to the relaxation of residual stress during the step of imidizing the polyimide precursor.

An example method for manufacturing a porous polyimide film includes forming a film from a polyimide precursor solution having silica particles dispersed therein, firing the film, and removing the silica particles. This method, however, requires the use of a chemical such as hydrofluoric acid to remove the silica particles. Such methods of manufacture lead to low productivity and high cost.

In addition, the use of silica particles will lead to cracking of the polyimide film after imidization since silica particles do not well absorb volume shrinkage during the imidation step. The use of silica particles will also result in ions remaining as impurities since a chemical such as hydrofluoric acid is used.

In contrast to such films, a porous polyimide film obtained by the method of manufacture according to this exemplary embodiment is formed without the use of silica particles, which may simplify the process of manufacturing a porous polyimide film. In addition, the resin particles are removed without the use of hydrofluoric acid, which may reduce ions remaining as impurities.

The polyimide precursor solution according to this exemplary embodiment and the method of manufacture thereof will now be described.

The polyimide precursor solution according to the first exemplary embodiment will be described first.

As described above, the resin particles in the polyimide precursor solution according to the first exemplary embodiment have a volume particle size distribution in which the volume frequency of the peak A accounts for 90% to 100%, preferably 95% or more, more preferably 98% or more, of the total volume frequency of all peaks of the volume particle size distribution. The volume frequency of the peak A may account for 100% of the total volume frequency of all peaks of the volume particle size distribution. That is, the resin particles in the polyimide precursor solution may have a particle size distribution with a single peak.

The proportion of the volume frequency of the peak A to the total volume frequency of all peaks of the volume particle size distribution is expressed as follows: (volume frequency of peak A)/(total volume frequency of all peaks)×100.

For reasons of the dispersibility of the resin particles in the polyimide precursor solution, the resin particles in the polyimide precursor solution according to the first exemplary embodiment may have a volume particle size distribution index (GSDv) of 1.30 or less (preferably 1.25 or less, more preferably 1.20 or less).

The resin particles in the polyimide precursor solution according to the first exemplary embodiment may have a volume average particle size (D50v) of 0.1 to 0.5 µm (preferably 0.25 to 0.5 µm, more preferably 0.25 to 0.48 µm, even more preferably 0.25 to 0.45 µm).

As used herein, the term "volume frequency" refers to the proportion of a group of resin particles in the particle size distribution of the resin particles in the polyimide precursor solution as measured on a volume basis.

The term "peak" refers to a point on a volume frequency distribution curve at which the curve changes direction from upward to downward along a hill-like portion as the curve rises and falls in the vertical direction. The volume frequency distribution curve is plotted against particle size ranges (channels) based on the particle size distribution measured by the method of measurement described below.

The particle size distribution of the resin particles in the polyimide precursor solution is measured as follows.

The polyimide precursor solution for measurement is diluted with water. The particle size distribution of the resin particles in the diluted polyimide precursor solution is then measured with a COULTER COUNTER LS 13 (available from Beckman Coulter, Inc.). Based on the measured particle size distribution, a cumulative volume distribution is plotted against particle size ranges (channels) from smaller sizes.

The volume particle size D16v of the cumulative volume distribution plotted from smaller sizes is determined as the particle size at which the cumulative volume is 16%. The volume average particle size D50v is determined as the particle size at which the cumulative volume is 50%. The volume particle size D84v is determined as the particle size at which the cumulative volume is 84%.

With these values, the volume particle size distribution index (GSDv) is calculated as $(D84v/D16v)^{1/2}$.

If this method is not suitable for measuring the volume particle size distribution of the resin particles in the polyimide precursor solution, the volume particle size distribution may instead be measured by other methods such as dynamic light scattering.

The polyimide precursor solution according to the first exemplary embodiment may contain any component that does not interfere with the properties described above. For example, the polyimide precursor solution according to the first exemplary embodiment may contain an aqueous solvent and an organic amine compound. In addition, the resin particles may have surface acidic groups.

Although the polyimide precursor solution according to the first exemplary embodiment may be manufactured by any method, the polyimide precursor solution may be manufactured, for example, by the following method for manufacturing a polyimide precursor solution.

Method for Manufacturing Polyimide Precursor Solution

The polyimide precursor solution according to this exemplary embodiment may be manufactured by the following method.

A dispersion of resin particles having surface acidic groups in an aqueous solvent is first provided. A tetracarboxylic dianhydride and a diamine compound are then polymerized in the resin particle dispersion in the presence of an organic amine compound to form a polyimide precursor.

Specifically, this method includes a step of providing a dispersion of resin particles having surface acidic groups in an aqueous solvent (which may be hereinafter referred to as "resin particle dispersion provision step") and a step of mixing the resin particle dispersion with an organic amine compound, a tetracarboxylic dianhydride, and a diamine compound and polymerizing the tetracarboxylic dianhydride and the diamine compound to form a polyimide precursor (which may be hereinafter referred to as "polyimide precursor formation step").

Resin Particle Dispersion Provision Step

The resin particle dispersion provision step may be performed in any manner that provides a dispersion of resin particles having surface acidic groups.

For example, the resin particle dispersion may be provided by weighing out resin particles that are insoluble in the polyimide precursor solution and that have surface acidic groups and an aqueous solvent for the resin particle dispersion and mixing them together with stirring. The resin particles and the aqueous solvent may be mixed together with stirring in any manner. For example, the resin particles may be mixed while the aqueous solvent is being stirred. To increase the dispersibility of the resin particles, for example, at least one of an ionic surfactant and a nonionic surfactant may also be mixed.

Alternatively, the resin particle dispersion may be provided by forming resin particles having surface acidic groups in an aqueous solvent. If the resin particles are formed in an aqueous solvent, the resin particle dispersion may be prepared by polymerizing a monomer component in the aqueous solvent. In this case, the dispersion may be prepared by known polymerization techniques. For example, if the resin particles are vinyl resin particles, the dispersion may be prepared by known polymerization techniques (e.g., radical polymerization techniques such as emulsion polymerization, soap-free emulsion polymerization, suspension polymerization, miniemulsion polymerization, and microemulsion polymerization).

For example, if emulsion polymerization is used for the manufacture of vinyl resin particles, vinyl resin particles may be formed by adding a vinyl-containing monomer such as a styrene or (meth)acrylic acid and optionally a surfactant such as sodium dodecyl sulfate or diphenyl oxide disulfonate to an aqueous solution of a water-soluble polymerization initiator such as potassium persulfate or ammonium persulfate and then heating the mixture with stirring to polymerize the vinyl-containing monomer. If the monomer component contains a monomer having an acidic group, the resulting vinyl resin particles have surface acidic groups.

The resin particle dispersion provision step need not be performed in the above manner; instead, a commercially available dispersion of resin particles in an aqueous solvent may be provided. If a commercially available resin particle dispersion is used, the resin particle dispersion may be subjected to a process such as dilution with an aqueous solvent depending on the purpose. For a dispersion of resin particles in an organic solvent, the organic solvent may be replaced with an aqueous solvent, provided that the replacement does not affect the dispersibility.

Polyimide Precursor Formation Step

A tetracarboxylic dianhydride and a diamine compound are then polymerized in the dispersion of resin particles having surface acidic groups in the presence of an organic amine compound to form a resin (polyimide precursor). A polyimide precursor solution is thus obtained.

This method may provide high productivity since an aqueous solvent is used and may also simplify the manufacturing process since a polyimide precursor solution is manufactured in one stage.

Specifically, the dispersion of resin particles having surface acidic groups provided in the resin particle dispersion provision step is mixed with an organic amine compound, a tetracarboxylic dianhydride, and a diamine compound. The tetracarboxylic dianhydride and the diamine compound are then polymerized in the presence of the organic amine compound to form a polyimide precursor in the resin particle dispersion. The resin particle dispersion may be mixed with the organic amine compound, the tetracarboxylic dianhydride, and the diamine compound in any order.

When the tetracarboxylic dianhydride and the diamine compound are polymerized in the dispersion of resin particles having surface acidic groups, the aqueous solvent present in the resin particle dispersion may be directly used to form a polyimide precursor. Optionally, a fresh aqueous solvent may be mixed. If a fresh aqueous solvent is mixed, the aqueous solvent may contain a small amount of an aprotic polar solvent. Other additives may also be mixed depending on the purpose.

These steps are performed to obtain a polyimide precursor solution having resin particles dispersed therein. The polyimide precursor solution contains an aqueous solvent, resin particles having surface acidic groups, an organic amine compound, and a polyimide precursor (which may be hereinafter referred to as "resin-particle-dispersed polyimide precursor solution").

The resin-particle-dispersed polyimide precursor solution obtained by these steps contains resin particles having a volume particle size distribution with one or more peaks. The volume frequency of a peak having the highest volume frequency of the one or more peaks accounts for 90% to 100% of the total volume frequency of all peaks of the volume particle size distribution. These steps may further provide a polyimide precursor solution containing resin particles having a volume particle size distribution index of 1.30 or less.

The components of the resin-particle-dispersed polyimide precursor solution will then be described.

Aqueous Solvent Containing Water

The aqueous solvent used in the resin particle dispersion for the preparation of the resin particle dispersion may be directly used for the polymerization of the tetracarboxylic dianhydride and the diamine compound in the resin particle dispersion. Alternatively, an aqueous solvent suitable for the polymerization of the tetracarboxylic dianhydride and the diamine compound may be prepared.

The aqueous solvent is an aqueous solvent containing water. Specifically, the aqueous solvent may be a solvent containing water in an amount of 50% by mass or more based on the total mass of the aqueous solvent. Examples of water include distilled water, deionized water, ultrafiltered water, and pure water.

Water is preferably present in the aqueous solvent in an amount of 50% to 100% by mass, more preferably 70% to 100% by mass, even more preferably 80% to 100% by mass, based on the total mass of the aqueous solvent.

The aqueous solvent used for the preparation of the resin particle dispersion is an aqueous solvent containing water. Specifically, the aqueous solvent for the resin particle dispersion may be a solvent containing water in an amount of 50% by mass or more based on the total mass of the aqueous solvent. Examples of water include distilled water, deionized water, ultrafiltered water, and pure water. If the aqueous solvent contains a water-soluble organic solvent in addition to water, the organic solvent may be, for example, a water-soluble alcohol solvent. As used herein, the term "water-soluble" means that the objective substance is soluble in water at 25° C. in an amount of 1% by mass or more.

If the aqueous solvent contains a solvent other than water, the solvent other than water may be, for example, a water-soluble organic solvent or an aprotic polar solvent. For example, for reasons of the transparency and mechanical strength of the resulting polyimide product, a water-soluble organic solvent may be used as the solvent other than water. In particular, an aprotic polar solvent may be incorporated into the aqueous solvent to improve the properties, such as heat resistance, electrical characteristics, and solvent resistance as well as transparency and mechanical strength, of the resulting polyimide product. In this case, to inhibit the dissolution and swelling of the resin particles in the resin-particle-dispersed polyimide precursor solution, the aprotic polar solvent may be present in an amount of 40% by mass or less, preferably 30% by mass or less, based on the total mass of the aqueous solvent. To inhibit the dissolution and swelling of the resin particles in the polyimide precursor solution during drying and film formation, the aprotic polar solvent may be present in an amount of 5% to 300% by mass, preferably 5% to 250% by mass, more preferably 5% to 200% by mass, based on the mass, on a solid basis, of the polyimide precursor in the polyimide precursor solution. As used herein, the term "water-soluble" means that the objective substance is soluble in water at 25° C. in an amount of 1% by mass or more.

A single water-soluble organic solvent or a combination of two or more water-soluble organic solvents may be used.

The water-soluble organic solvent may be a water-soluble organic solvent in which the resin particles, described later, are insoluble. This is because, for example, if the aqueous solvent contains water and a water-soluble organic solvent, the resin particles might dissolve into the aqueous solvent during film formation even if the resin particles have not dissolved into the resin particle dispersion. Such solvents may be used, however, provided that the dissolution and swelling of the resin particles during film formation are limited.

Water-soluble ether solvents are water-soluble solvents having an ether bond per molecule. Examples of water-soluble ether solvents include tetrahydrofuran (THF), dioxane, trioxane, 1,2-dimethoxyethane, diethylene glycol dimethyl ether, and diethylene glycol diethyl ether. Tetrahydrofuran and dioxane are preferred among these water-soluble ether solvents.

Water-soluble ketone solvents are water-soluble solvents having a ketone group per molecule. Examples of water-soluble ketone solvents include acetone, methyl ethyl ketone, and cyclohexanone. Acetone is preferred among these water-soluble ketone solvents.

Water-soluble alcohol solvents are water-soluble solvents having an alcoholic hydroxy group per molecule. Examples of water-soluble alcohol solvents include methanol, ethanol, 1-propanol, 2-propanol, tert-butyl alcohol, ethylene glycol, ethylene glycol monoalkyl ether, propylene glycol, propylene glycol monoalkyl ether, diethylene glycol, diethylene glycol monoalkyl ether, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerol, 2-ethyl-2-hydroxymethyl-1,3-propanediol, and 1,2,6-hexanetriol. Preferred among these water-soluble alcohol solvents are methanol, ethanol, 2-propanol, ethylene glycol, ethylene glycol monoalkyl ether, propylene glycol, propylene glycol monoalkyl ether, diethylene glycol, and diethylene glycol monoalkyl ether.

If the aqueous solvent contains an aprotic polar solvent in addition to water, the aprotic polar solvent used in combination may be a solvent having a boiling point of 150° C. to 300° C. and a dipole moment of 3.0 to 5.0 D. Specific examples of aprotic polar solvents include N-methyl-2-pyrrolidone (NMP), N,N-dimethylformamide (DMF), N,N-dimethylacetamide (DMAc), dimethyl sulfoxide (DMSO), hexamethylphosphoramide (HMPA), N-methylcaprolactam, N-acetyl-2-pyrrolidone, 1,3-dimethyl-2-imidazolidinone (DMI), N,N'-dimethylpropyleneurea, tetramethylurea, trimethyl phosphate, and triethyl phosphate.

If the aqueous solvent contains a solvent other than water, the solvent used in combination may have a boiling point of 270° C. or lower, preferably 60° C. to 250° C., more preferably 80° C. to 230° C. If the solvent used in combination has a boiling point within such a range, the resulting polyimide product may contain little residual solvent other than water and may also have high mechanical strength.

The solubility of the polyimide precursor in the aqueous solvent varies depending on the amount of water and the type and amount of organic amine compound. The polyimide precursor is readily soluble in an aqueous solvent containing a small amount of water if the aqueous solvent contains a small amount of organic amine compound. Conversely, the polyimide precursor is readily soluble in an aqueous solvent containing a large amount of water if the aqueous solvent contains a large amount of organic amine compound. The polyimide precursor is also readily soluble in an aqueous solvent containing a large amount of water if the aqueous solvent contains a highly hydrophilic organic amine compound such as one having a hydroxy group.

Resin Particles

Although the resin particles may be formed of any resin that does not dissolve into the aqueous solvent or the polyimide precursor solution, the resin particles may be formed of a resin other than polyimide. Examples of such resins include condensation polymers of polymerizable monomers, such as polyester resins and urethane resins, and radical polymers of polymerizable monomers, such as vinyl resins, olefin resins, and fluorocarbon resins. Examples of radical polymers include (meth)acrylic resins, (meth)acrylate resins, styrene-(meth)acrylic resins, polystyrene resins, and polyethylene resins.

Preferred among these resins is at least one resin selected from the group consisting of (meth)acrylic resins, (meth) acrylate resins, styrene-(meth)acrylic resins, and polystyrene resins.

The resin particles may be either crosslinked or uncrosslinked. Uncrosslinked resin particles are preferred, which may contribute effectively to the relaxation of residual stress during the step of imidizing the polyimide precursor. Vinyl resin particle dispersions obtained by emulsion polymerization are more preferred, which may simplify the process of manufacturing the resin-particle-dispersed polyimide precursor solution.

As used herein, the term "(meth)acrylic" refers to both acrylic and methacrylic.

If the resin particles are vinyl resin particles, the resin particles are obtained by the polymerization of a monomer. Examples of vinyl resin monomers include the following monomers: styrenes, i.e., compounds having a styrene backbone, such as styrene, alkyl-substituted styrenes (e.g., α-methylstyrene, 2-methylstyrene, 3-methylstyrene, 4-methylstyrene, 2-ethylstyrene, 3-ethylstyrene, and 4-ethylstyrene), halogen-substituted styrenes (e.g., 2-chlorostyrene, 3-chlorostyrene, and 4-chlorostyrene), and vinylnaphthalene; vinyl-containing esters such as methyl (meth) acrylate, ethyl (meth)acrylate, n-propyl (meth)acrylate, n-butyl (meth)acrylate, lauryl (meth)acrylate, 2-ethylhexyl (meth)acrylate, and trimethylolpropane trimethacrylate (TMPTMA); vinyl nitriles such as acrylonitrile and methacrylonitrile; vinyl ethers such as vinyl methyl ether and vinyl isobutyl ether; vinyl ketones such as vinyl methyl ketone, vinyl ethyl ketone, and vinyl isopropenyl ketone; acids such as (meth)acrylic acid, maleic acid, cinnamic acid, fumaric acid, and vinylsulfonic acid; bases such as ethyleneimine, vinylpyridine, and vinylamine.

Other monomers that may be used in combination include monofunctional monomers such as vinyl acetate, difunctional monomers such as ethylene glycol dimethacrylate, nonanediol diacrylate, and decanediol diacrylate; and polyfunctional monomers such as trimethylolpropane triacrylate and trimethylolpropane trimethacrylate.

These monomers may be used alone to obtain a vinyl resin or may be used in combination to obtain a copolymer resin.

The acidic groups present on the surfaces of the resin particles may be, but not limited to, at least one type of acidic group selected from the group consisting of carboxy, sulfo, and phenolic hydroxy groups. Carboxy groups are preferred among these acidic groups.

The monomer used to form the resin particles having surface acidic groups may be any monomer having an acidic group. Examples of monomers having an acidic group include carboxy-containing monomers, sulfo-containing monomers, phenolic-hydroxy containing monomers, and salts thereof.

Specific examples of monomers having an acidic group include sulfo-containing monomers such as p-styrenesulfonic acid and 4-vinylbenzenesulfonic acid; phenolic-hydroxy containing monomers such as 4-vinyldihydrocinnamic acid, 4-vinylphenol, and 4-hydroxy-3-methoxy-1-propenylbenzene; carboxy-containing monomers such as acrylic acid, crotonic acid, methacrylic acid, 3-methylcrotonic acid, fumaric acid, maleic acid, 2-methylisocrotonic acid, 2,4-hexadienedioic acid, 2-pentenoic acid, sorbic acid, citraconic acid, 2-hexenoic acid, and monoethyl fumarate; and salts thereof. These monomers having an acidic group may be mixed and polymerized with monomers having no acidic group. Alternatively, a monomer having no acidic group may be polymerized to form particles before a monomer having an acidic group is polymerized on the surfaces of the particles. These monomers may be used alone or in combination.

Preferred among these monomers are carboxy-containing monomers such as acrylic acid, crotonic acid, methacrylic acid, 3-methylcrotonic acid, fumaric acid, maleic acid, 2-methylisocrotonic acid, 2,4-hexadienedioic acid, 2-pentenoic acid, sorbic acid, citraconic acid, 2-hexenoic acid, monoethyl fumarate, and salts thereof. These carboxy-containing monomers may be used alone or in combination.

That is, the resin particles having surface acidic groups may have a backbone derived from at least one carboxy-containing monomer selected from the group consisting of acrylic acid, crotonic acid, methacrylic acid, 3-methylcrotonic acid, fumaric acid, maleic acid, 2-methylisocrotonic acid, 2,4-hexadienedioic acid, 2-pentenoic acid, sorbic acid, citraconic acid, 2-hexenoic acid, monoethyl fumarate, and salts thereof.

If a monomer having an acidic group and a monomer having no acidic group are mixed and polymerized together, any amount of the monomer having an acidic group may be used. However, the use of an insufficient amount of the monomer having an acidic group may decrease the dispersibility of the resin particles in the polyimide precursor solution, whereas the use of an excessive amount of the monomer having an acidic group may result in the formation of polymer aggregates after emulsion polymerization. Accordingly, the monomer having an acidic group is preferably used in an amount of 0.3% to 20% by mass, more preferably 0.5% to 15% by mass, even more preferably 0.7% to 10% by mass, based on the total mass of the monomers.

On the other hand, if a monomer having no acidic group is subjected to emulsion polymerization before a monomer having an acidic group is added and polymerized, the monomer having an acidic group is preferably used in an amount of 0.01% to 10% by mass, more preferably 0.05% to 7% by mass, even more preferably 0.07% to 5% by mass, based on the total mass of the monomers for the same reason as above.

As described above, uncrosslinked resin particles are preferred; however, if a crosslinking agent is used as at least a portion of the monomer component to obtain crosslinked resin particles, the crosslinking agent is preferably used in an amount of 0% to 20% by mass, more preferably 0% to 5% by mass, even more preferably 0% by mass, based on the total mass of the monomer component.

If the monomer component used for the resin that forms vinyl resin particles contains styrene, styrene is preferably used in an amount of 20% to 100% by mass, more preferably 40% to 100% by mass, based on the total mass of the monomer component.

The resin particles may have any average particle size. For example, the resin particles may have an average particle size of 0.1 to 0.5 μm, preferably 0.25 to 0.5 μm, more preferably 0.25 to 0.48 μm, even more preferably 0.25 to 0.45 μm. The use of resin particles having an average particle size within such a range may improve the productivity of the resin particles and may reduce aggregation.

The average particle size of the resin particles is measured as follows. Based on a particle size distribution obtained by measurement with a laser diffraction particle size distribution analyzer (e.g., COULTER COUNTER LS 13 mentioned above, available from Beckman Coulter, Inc.), a cumulative distribution by volume is plotted against particle size ranges (channels) from smaller sizes. The volume average particle size D50v is then determined as the particle size at which the cumulative volume is 50% of all particles.

A monomer having an acidic group may be polymerized on the surfaces of commercially available resin particles. Specific examples of crosslinked resin particles include crosslinked poly(methyl methacrylate) resin particles (MBX-series available from Sekisui Plastics Co., Ltd.), crosslinked polystyrene resin particles (SBX-series available from Sekisui Plastics Co., Ltd.), and crosslinked methyl methacrylate-styrene copolymer resin particles (MSX-series available from Sekisui Plastics Co., Ltd.).

Examples of uncrosslinked resin particles include poly (methyl methacrylate) resin particles (MB-series available from Sekisui Plastics Co., Ltd.) and (meth)acrylate-styrene copolymer resin particles (FS-series available from Nippon Paint Co., Ltd.).

The resin particles may be present in the polyimide precursor solution in an amount of 20 to 600 parts by mass (preferably 25 to 550 parts by mass, more preferably 30 to 500 parts by mass) based on 100 parts by mass, on a solid basis, of the polyimide precursor in the polyimide precursor solution.

Polyimide Precursor

The polyimide precursor is obtained by the polymerization of a tetracarboxylic dianhydride and a diamine compound. Specifically, the polyimide precursor is a resin (polyamic acid) having a repeating unit represented by general formula (I):

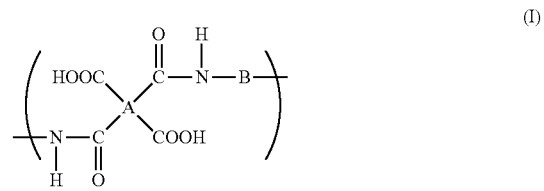

where A is a tetravalent organic group, and B is a divalent organic group.

In general formula (I), the tetravalent organic group for A is the residue of the tetracarboxylic dianhydride used as a starting material, excluding the four carboxy groups.

The divalent organic group for B is the residue of the diamine compound used as a starting material, excluding the two amino groups.

That is, the polyimide precursor having the repeating unit represented by general formula (I) is a polymer of the tetracarboxylic dianhydride and the diamine compound.

Although the tetracarboxylic dianhydride may be either an aromatic compound or an aliphatic compound, aromatic compounds are preferred. That is, the tetravalent organic group for A in general formula (I) is preferably an aromatic organic group.

Examples of aromatic tetracarboxylic dianhydrides include pyromellitic dianhydride, 3,3',4,4'-benzophenonetetracarboxylic dianhydride, 3,3',4,4'-biphenyl sulfone tetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, 2,3,3',4'-biphenyltetracarboxylic dianhydride, bis(phthalic acid) phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenyl ether dianhydride, and bis(triphenylphthalic acid)-4,4'-diphenylmethane dianhydride.

Examples of aliphatic tetracarboxylic dianhydrides include aliphatic and alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride; and aliphatic tetracarboxylic dianhydrides having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Aromatic tetracarboxylic dianhydrides are preferred among these tetracarboxylic dianhydrides. Specific preferred examples of aromatic tetracarboxylic dianhydrides include pyromellitic dianhydride, 3,3',4,4'-biphenyltetracarboxylic dianhydride, 2,3,3',4'-biphenyltetracarboxylic dianhydride, 3,3',4,4'-biphenyl ether tetracarboxylic dianhydride, and 3,3',4,4'-benzophenonetetracarboxylic dianhydride, more preferably pyromellitic dianhydride, 3,3',4,4'-biphenyltetracarboxylic dianhydride, and 3,3',4,4'-benzophenonetetracarboxylic dianhydride, even more preferably 3,3',4,4'-biphenyltetracarboxylic dianhydride.

These tetracarboxylic dianhydrides may be used alone or in combination.

If a combination of two or more tetracarboxylic dianhydrides are used, a combination of aromatic tetracarboxylic dianhydrides alone, a combination of aliphatic tetracarboxylic dianhydrides alone, or a combination of aromatic and aliphatic tetracarboxylic dianhydrides may be used.

The diamine compound is a diamine compound having two amino groups in its molecular structure. Although the diamine compound may be either an aromatic compound or an aliphatic compound, aromatic compounds are preferred. That is, the divalent organic group for B in general formula (I) is preferably an aromatic organic group.

Examples of diamine compounds include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups attached to an aromatic ring and a heteroatom other than the nitrogen atoms of the amino groups, such as diaminotetraphenylthiophene; and aliphatic and alicyclic diamines such as 1,1-m-xlylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,0$^{2.7}$]-undecylenedimethyldiamine, and 4,4'-methylenebis(cyclohexylamine).

Aromatic diamine compounds are preferred among these diamine compounds. Specific preferred examples of aromatic diamine compounds include p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone, more preferably 4,4'-diaminodiphenyl ether and p-phenylenediamine.

These diamine compounds may be used alone or in combination. If a combination of two or more diamine compounds are used, a combination of aromatic diamine compounds alone, a combination of aliphatic diamine compounds alone, or a combination of aromatic and aliphatic diamine compounds may be used.

The polyimide precursor may have a number average molecular weight of 1,000 to 150,000, preferably 5,000 to 130,000, more preferably 10,000 to 100,000.

The use of a polyimide precursor having a number average molecular weight within such a range may reduce a decrease in the solubility of the polyimide precursor in the solvent and may provide sufficient film-forming ability.

The number average molecular weight of the polyimide precursor is measured by gel permeation chromatography (GPC) under the following measurement conditions:

Column: Tosoh TSKgel α-M (7.8 mm I.D×30 cm)
Eluent: dimethylformamide (DMF)/30 mM LiBr/60 mM phosphoric acid
Flow rate: 0.6 mL/min
Injection volume: 60 μL
Detector: differential refractive index (RI) detector The polyimide precursor may be present in an amount (concentration) of 0.1% to 40% by mass, preferably 0.5% to 25% by mass, more preferably 1% to 20% by mass, based on the total mass of the polyimide precursor solution.

Organic Amine Compound

The organic amine compound may increase the solubility of the polyimide precursor in the aqueous solvent by forming an amine salt with the polyimide precursor (its carboxy groups) and may also function as an imidization accelerator. Specifically, the organic amine compound may be an amine compound having a molecular weight of 170 or less. The organic amine compound may be a compound other than the diamine compound used as a starting material for the polyimide precursor.

The organic amine compound may be a water-soluble compound. The term "water-soluble" means that the objective substance is soluble in water at 25° C. in an amount of 1% by mass or more.

Examples of organic amine compounds include primary, secondary, and tertiary amine compounds.

Preferred among these organic amine compounds is at least one amine compound selected from the group consisting of secondary and tertiary amine compounds (particularly, tertiary amine compounds). The use of a secondary or tertiary amine compound (particularly, a tertiary amine compound) as the organic amine compound may increase the solubility of the polyimide precursor in the solvent and may thus improve the film-forming ability. In addition, the storage stability of the polyimide precursor solution may be improved.

Examples of organic amine compounds include monoamine compounds and polyamine compounds, including diamine compounds. The use of polyamine compounds, including diamine compounds, may facilitate the formation of a pseudo-crosslink structure between polyimide precursor molecules and may also improve the storage stability of the polyimide precursor solution.

Examples of primary amine compounds include methylamine, ethylamine, n-propylamine, isopropylamine, 2-ethanolamine, and 2-amino-2-methyl-1-propanol.

Examples of secondary amine compounds include dimethylamine, 2-(methylamino)ethanol, 2-(ethylamino)ethanol, and morpholine.

Examples of tertiary amine compounds include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, and 2-ethyl-4-methylimidazole.

Tertiary amine compounds are preferred for reasons of the pot life of the polyimide precursor solution and film thickness uniformity. In this respect, more preferred is at least one amine compound selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine.

For reasons of film-forming ability, amine compounds (particularly, tertiary amine compounds) having a nitrogen-containing heterocyclic structure may also be used as the organic amine compound. Examples of amine compounds having a nitrogen-containing heterocyclic structure (hereinafter referred to as "nitrogen-containing heterocyclic amine compound") include isoquinolines (amine compounds having an isoquinoline backbone), pyridines (amine compounds having a pyridine backbone), pyrimidines (amine compounds having a pyrimidine backbone), pyrazines (amine compounds having a pyrazine backbone), piperazines (amine compounds having a piperazine backbone), triazines (amine compounds having a triazine backbone), imidazoles (amine compounds having an imidazole backbone), morpholines (amine compounds having a morpholine backbone), polyaniline, polypyridine, and polyamine.

For reasons of film-forming ability, at least one nitrogen-containing heterocyclic amine compound selected from the group consisting of morpholines, pyridines, piperidines, and imidazoles is preferred, more preferably morpholines (amine compounds having a morpholine backbone). Preferred among these organic amine compounds is at least one compound selected from the group consisting of N-methylmorpholine, N-methylpiperidine, pyridine, 1,2-dimethylimidazole, 2-ethyl-4-methylimidazole, and picoline, more preferably N-methylmorpholine.

Preferred among these organic amine compounds are those having a boiling point of 60° C. or higher (preferably 60° C. to 200° C., more preferably 70° C. to 150° C.). The use of an organic amine compound having a boiling point of 60° C. or higher may reduce the evaporation of the organic amine compound from the polyimide precursor solution during storage and may thus reduce a decrease in the solubility of the polyimide precursor in the solvent.

The organic amine compound may be present in an amount of 50 to 500 mole percent, preferably 80 to 250 mole percent, more preferably 90 to 200 mole percent, based on the number of moles of carboxy groups (—COOH) on the polyimide precursor in the polyimide precursor solution.

The use of the organic amine compound in an amount within such a range may increase the solubility of the polyimide precursor in the solvent and may thus improve the film-forming ability. In addition, the storage stability of the polyimide precursor solution may be improved.

These organic amine compounds may be used alone or in combination.

Other Additives

In the method for manufacturing the polyimide precursor solution according to this exemplary embodiment, the polyimide precursor solution may contain other additives such as catalysts for promoting the imidization reaction and leveling agents for improving the film quality.

Examples of catalysts for promoting the imidization reaction that may be used include dehydrating agents such as acid anhydrides and acid catalysts such as phenol derivatives, sulfonic acid derivatives, and benzoic acid derivatives.

The polyimide precursor solution may also contain, for example, a conductive material (i.e., conductive (e.g., having a volume resistivity of less than $10^7$ $\Omega \cdot cm$) or semiconductive (e.g., having a volume resistivity of $10^7$ to $10^{13}$ $\Omega \cdot cm$)), which is added to impart conductivity, depending on the purpose of use.

Examples of conductive materials include carbon black (e.g., acidic carbon black with a pH of 5.0 or less); metals (e.g., aluminum and nickel); metal oxides (e.g., yttrium oxide and tin oxide); and ionic conductors (e.g., potassium titanate and LiCl). These conductive materials may be used alone or in combination.

The polyimide precursor solution may also contain inorganic particles. The inorganic particles are added to improve the mechanical strength depending on the purpose of use. Examples of inorganic particles include particulate materials such as silica powder, alumina powder, barium sulfate powder, titanium oxide powder, mica, and talc.

Resin-Particle Containing Polyimide Film

A resin-particle containing polyimide film according to this exemplary embodiment is obtained by applying the polyimide precursor solution according to this exemplary embodiment to form a coating and heating the coating.

The term "resin-particle containing polyimide film" encompasses both resin-particle containing polyimide films after the completion of imidation and partially imidized resin-particle containing polyimide films before the completion of imidation.

Specifically, the resin-particle containing polyimide film according to this exemplary embodiment is obtained by, for example, a step of applying the polyimide precursor solution according to this exemplary embodiment to form a coating (hereinafter referred to as "coating formation step") and a step of heating the coating to form a polyimide film (hereinafter referred to as "heating step").

Coating Formation Step

A polyimide precursor solution having resin particles dispersed therein (resin-particle-dispersed polyimide precursor solution) as described above is first provided. The resin-particle-dispersed polyimide precursor solution is then applied to a substrate to form a coating.

Examples of substrates include resin substrates, glass substrates, ceramic substrates, metal substrates, and composite material substrates formed of combinations of these materials. The substrate may be subjected to release treatment to form a release layer.

The resin-particle-dispersed polyimide precursor solution may be applied to the substrate by any technique, including various techniques such as spray coating, rotation coating, roller coating, bar coating, slit die coating, and inkjet coating.

Various substrates may be used depending on the intended use. Examples of substrates include various substrates for liquid crystal devices, semiconductor substrates on which integrated circuits are formed, wiring substrates on which wiring lines are formed, printed substrates on which electronic components and wiring lines are disposed, and substrates for electric wire coverings.

Heating Step

The coating obtained in the coating formation step is then subjected to drying treatment. This drying treatment forms a film (unimidized dry film).

The heating conditions for the drying treatment may include, for example, a temperature of 80° C. to 200° C. and a heating time of 10 to 60 minutes. The heating time may be shortened at higher temperatures. It may also be effective to blow hot air during heating. During heating, the temperature may be increased stepwise or without a change in rate.

The unimidized dry film is then subjected to imidization treatment by heating. This treatment forms a polyimide resin layer.

The heating conditions for the imidization treatment may include, for example, a temperature of 150° C. to 450° C. (preferably 200° C. to 430° C.) and a heating time of 20 to 60 minutes. Under such heating conditions, an imidization reaction occurs, thus forming a polyimide film. During the heating reaction, the temperature may be increased stepwise or gradually at a constant rate before the ultimate heating temperature is reached.

The above steps are performed to form a resin-particle containing polyimide film. Optionally, the resin-particle containing polyimide film is removed from the substrate to obtain a resin-particle containing polyimide film. The resin-particle containing polyimide film may be subjected to post-processing depending on the intended use.

Method for Manufacturing Porous Polyimide Film

A method for manufacturing a porous polyimide film according to this exemplary embodiment includes a first step of applying the polyimide precursor solution according to this exemplary embodiment to form a coating and drying the coating to form a film containing the polyimide precursor and the resin particles and a second step of heating the film to imidize the polyimide precursor and thereby form a polyimide film. The second step includes resin particle removal treatment.

The method for manufacturing the porous polyimide film according to this exemplary embodiment will now be described.

The method of manufacture will be described with reference to the FIGURE, where like parts are labeled with like reference numerals. The FIGURE illustrates a substrate 3, a release layer 4, pores 7, and a porous polyimide film 62.

First Step

In the first step, a polyimide precursor solution containing an aqueous solvent and resin particles (resin-particle-dispersed polyimide precursor solution) is first provided. The resin-particle-dispersed polyimide precursor solution is then applied to a substrate to form a coating containing the polyimide precursor solution and the resin particles. The coating formed on the substrate is then dried to form a film containing the polyimide precursor and the resin particles.

A non-limiting example of a method for forming a coating containing the polyimide precursor solution and the resin particles on the substrate in the first step is shown below.

Specifically, a dispersion of resin particles in an aqueous solvent is first provided. The resin particle dispersion is then mixed with an organic amine compound, a tetracarboxylic dianhydride, and diamine compound, and the tetracarboxylic dianhydride and the diamine compound are polymerized to form a polyimide precursor. The resulting resin-particle-dispersed polyimide precursor solution is then applied to a substrate to form a coating containing the polyimide precursor solution and the resin particles. The resin particles may be distributed in the coating with reduced aggregation.

The resin-particle-dispersed polyimide precursor solution may be applied to any substrate. Examples of substrates include resin substrates such as polystyrene and polyethylene terephthalate substrates; glass substrates; ceramic substrates; metal substrates such as iron and stainless steel (SUS) substrates; and composite material substrates formed of combinations of these materials. The substrate may optionally be subjected to, for example, release treatment with a release agent such as a silicone or fluorinated release agent to form a release layer.

The resin-particle-dispersed polyimide precursor solution may be applied to the substrate by any technique, including various techniques such as spray coating, rotation coating, roller coating, bar coating, slit die coating, and inkjet coating.

The amount of polyimide precursor solution used to form a coating containing the polyimide precursor solution and the resin particles may be determined so that the coating has a predetermined thickness.

After a coating containing the polyimide precursor solution and the resin particles is formed, the coating is dried to form a film containing the polyimide precursor and the resin particles. Specifically, the coating containing the polyimide precursor solution and the resin particles is dried to form a film by a technique such as heat drying, natural air drying, or vacuum drying. More specifically, the coating is dried to form a film so that the amount of solvent remaining in the film is 50% or less, preferably 30% or less, based on the solid content of the film. The polyimide precursor in this film remains soluble in water.

Second Step

The second step is a step of heating the film obtained in the first step, which contains the polyimide precursor and the resin particles, to imidize the polyimide precursor and thereby form a polyimide film. The second step includes resin particle removal treatment. The resin particle removal treatment is performed to obtain a porous polyimide film.

Specifically, in the second step, a polyimide film is formed by heating the film obtained in the first step, which contains the polyimide precursor and the resin particles, to facilitate imidization and further heating the film to form a polyimide film. As the imidization proceeds and the degree of imidization becomes higher, the film becomes less soluble in organic solvents.

In the second step, the resin particle removal treatment is performed. The resin particles may be removed by heating the film during the polyimide precursor imidization process or may be removed from the polyimide film after the completion of the imidization (i.e., after the imidization).

As used herein, the term "polyimide precursor imidization process" refers to the process during which the film obtained in the first step, which contains the polyimide precursor and the resin particles, is heated to facilitate imidization before the completion of the imidization of the polyimide film.

For reasons of ease of removing the resin particles, the resin particle removal treatment may be performed during the polyimide precursor imidization process when the polyimide precursor in the polyimide film has a degree of imidization of 10% or more. A polyimide film having a degree of imidization of 10% or more may be poorly soluble in organic solvents and may thus maintain its shape.

The resin particle removal treatment may be performed, for example, by heating the resin particles, by dissolving the resin particles in an organic solvent, or by decomposing the resin particles with a device such as a laser. Among these techniques, it is preferred to remove the resin particles by heating the resin particles or by dissolving the resin particles in an organic solvent.

If the resin particles are removed by heating the resin particles, the resin particles may be removed, for example, by decomposing the resin particles by the heating for facilitating imidization during the polyimide precursor imidization process. This technique may reduce the number of steps since there is no need to remove the resin particles with a solvent. Heating, however, may produce decomposition gas depending on the type of resin particle. This decomposition gas may lead to, for example, breaking and cracking of the porous polyimide film. Accordingly, in such cases, the resin particles may be removed by dissolving the resin particles in an organic solvent.

If the resin particles are removed by dissolving the resin particles in an organic solvent, the resin particles may be removed, for example, by contacting the resin particles with an organic solvent (e.g., immersing the resin particles in the solvent) to dissolve the resin particles in the solvent. In this case, the immersion of the resin particles in the solvent may allow the resin particles to dissolve with a higher efficiency.

The organic solvent used to dissolve and remove the resin particles may be any organic solvent that dissolves the resin particles but does not dissolve the polyimide film before and after the completion of the imidation. Examples of such organic solvents include ethers such as tetrahydrofuran; aromatic hydrocarbons such as toluene; ketones such as acetone; and esters such as ethyl acetate.

In the second step, the film obtained in the first step may be heated to facilitate imidation and thereby form a polyimide film by any heating process. For example, a two-stage heating process may be employed. If the film is heated in two stages, the following specific heating conditions may be employed.

The heating conditions for the first stage may include a temperature at which the resin particles maintain their shape. Specifically, the film may be heated at, for example, 50° C. to 150° C., preferably 60° C. to 140° C. The heating time may be 10 to 60 minutes. The heating time may be shortened at higher heating temperatures.

The heating conditions for the second stage may include, for example, a temperature of 150° C. to 450° C. (preferably 200° C. to 430° C.) and a heating time of 20 to 120 minutes. Under such heating conditions, an imidization reaction may proceed further, thus forming a polyimide film. During the heating reaction, the temperature may be increased stepwise or gradually at a constant rate before the ultimate heating temperature is reached.

The heating process need not be a two-stage heating process as described above; for example, a one-stage heating process may be employed instead. For a one-stage heating process, for example, imidation may be completed only under the heating conditions for the second stage shown above.

In the second step, the resin particles may be exposed by resin particle exposure treatment to increase the open area fraction. The resin particle exposure treatment in the second step may be performed during the polyimide precursor imidization process or may be performed after the imidation and before the resin particle removal treatment.

In this case, for example, if the resin-particle-dispersed polyimide precursor solution is used to form a film on a substrate, the resin-particle-dispersed polyimide precursor solution is applied to the substrate to form a coating having the resin particles buried therein. The coating is then dried to form a film containing the polyimide precursor and the resin particles. The film formed by this method has the resin particles buried therein. Before the film is heated to perform the resin particle removal treatment, the resin particle exposure treatment may be performed during the polyimide precursor imidization process or may be performed on the polyimide film after the completion of the imidization (i.e., after the imidization).

The resin particle exposure treatment in the second step may be performed, for example, when the polyimide film is in any of the following states.

When the polyimide precursor in the polyimide film has a degree of imidization of less than 10% (i.e., when the polyimide film is soluble in water), the resin particles buried in the polyimide film may be exposed by treatment such as wiping or immersion in water.

When the polyimide precursor in the polyimide film has a degree of imidization of 10% or more (i.e., when the polyimide film is poorly soluble in water and organic solvents), or after the imidization of the polyimide film is complete, the resin particles buried in the polyimide film may be exposed, for example, by mechanically cutting the resin particles with a tool such as sandpaper or by decomposing the resin particles with a device such as a laser.

For example, for mechanical cutting, the portions of the resin particles that are present in the upper regions of the resin particles buried in the polyimide film (i.e., the regions of the resin particles located away from the substrate) are cut together with the portion of the polyimide film present above the resin particles. The cut resin particles are exposed in the surface of the polyimide film.

The polyimide film having the exposed resin particles is then subjected to the resin particle removal treatment described above to remove the resin particles therefrom. The resin particles are removed to obtain a porous polyimide film (see the FIGURE).

Although a porous polyimide film manufacturing process in which the resin particle exposure treatment is performed in the second step has been described above, the resin particle exposure treatment may instead be performed in the first step to increase the open area fraction. In this case, the resin particle exposure treatment may be performed to expose the resin particles during the process of drying the coating to form a film in the first step. The resin particle exposure treatment may increase the open area fraction of the porous polyimide film.

For example, as described above, the polyimide precursor in the film remains soluble in water during the process of drying the coating containing the polyimide precursor solution and the resin particles to form a film containing the polyimide precursor and the resin particles. While the film is in this state, the resin particles may be exposed, for example, by treatment such as wiping or immersion in water. Specifically, the polyimide precursor solution present in the region above the thickness of the resin particle layer may be removed to expose the resin particle layer, for example, by wiping with water. Thus, the resin particles present in the upper region of the resin particle layer (i.e., the region of the resin particle layer located away from the substrate) are exposed in the surface of the film.

The polyimide film may have a skin layer having no pores in the surface thereof, as does a gas separation membrane. In this case, the resin particle exposure treatment may be omitted.

In the second step, the substrate that has been used to form the coating in the first step may be stripped after the coating is dried to form a film, after the polyimide precursor in the polyimide film becomes poorly soluble in organic solvents, or after the imidization of the film is complete.

The above steps are performed to obtain a porous polyimide film. The porous polyimide film may then be subjected to post-processing depending on the purpose of use.

The degree of imidization of the polyimide precursor will now be described.

An example of a partially imidized polyimide precursor is a precursor having a structure containing repeating units represented by general formulas (I-1), (I-2), and (I-3):

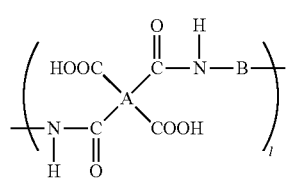

(I-1)

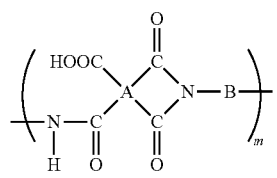

(I-2)

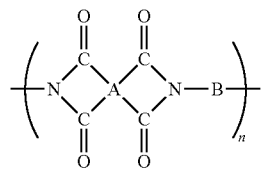

(I-3)

where A is a tetravalent organic group, B is a divalent organic group, l is an integer of 1 or more, and m and n are each independently an integer of 0 or more.

A and B are as defined in general formula (I) above.

The degree of imidization of the polyimide precursor is expressed as the proportion of the number of bonds (i.e., reaction sites between the tetracarboxylic dianhydride and the diamine compound) that form an imide ring (i.e., 2n+m) to the total number of bonds in the polyimide precursor (i.e., 2l+2m+2n). That is, the degree of imidization of the polyimide precursor is expressed as (2n+m)/(2l+2m+2n).

The degree of imidization (the value of (2n+m)/(2l+2m+2n)) of the polyimide precursor is determined by the following procedure.

Measurement of Degree of Imidization of Polyimide Precursor Preparation of Polyimide Precursor Sample (i) The polyimide precursor composition for measurement is applied to a silicon wafer to form a coating sample having a thickness of 1 to 10 μm.

(ii) The coating sample is immersed in tetrahydrofuran (THF) for 20 minutes to replace the solvent in the coating sample with THF. The solvent used for immersion need not be THF, but may be selected from solvents that do not dissolve the polyimide precursor and that are miscible with the solvent component present in the polyimide precursor composition. Specifically, alcohol solvents such as methanol and ethanol and ether compounds such as dioxane may be used.

(iii) The coating sample is taken out of THF, and any THF is removed from the surface of the coating sample by blowing $N_2$ gas. The coating sample is dried under a reduced pressure of 10 mmHg or less at 5° C. to 25° C. for 12 hours or more to obtain a polyimide precursor sample.

Preparation of 100% Imidized Standard Sample (iv) As in step (i) above, the polyimide precursor composition for measurement is applied to a silicon wafer to form a coating sample.

(v) The coating sample is heated at 380° C. for 60 minutes to perform an imidization reaction and thereby form a 100% imidized standard sample.

Measurement and Analysis (vi) The infrared absorption spectrum of the 100% imidized standard sample is measured with a Fourier transform infrared spectrophotometer (FT-730 available from Horiba, Ltd.). The ratio of the absorption peak derived from imide bonds around 1,780 $cm^{-1}$ (Ab'(1,780 $cm^{-1}$)) to the absorption peak derived from aromatic rings around 1,500 $cm^{-1}$ (Ab'(1,500 $cm^{-1}$)) of the 100% imidized standard sample, I'(100), is determined.

(vii) Similarly, the infrared absorption spectrum of the polyimide precursor sample is measured. The ratio of the absorption peak derived from imide bonds around 1,780 $cm^{-1}$ (Ab(1,780 $cm^{-1}$)) to the absorption peak derived from aromatic rings around 1,500 $cm^{-1}$ (Ab(1,500 $cm^{-1}$)) of the polyimide precursor sample, I(x), is determined.

The ratios I'(100) and I(x) of the measured absorption peaks are used to calculate the degree of imidization of the polyimide precursor based on the following equations:

Degree of imidization of polyimide precursor=$I(x)/I'(100)$ $I'(100)=(Ab'(1,780\ cm^{-1}))/(Ab'(1,500\ cm^{-1}))$ $I(x)=(Ab(1,780\ cm^{-1}))/(Ab(1,500\ cm^{-1}))$ This measurement of the degree of imidization of polyimide precursors is used for the measurement of the degree of imidization of aromatic polyimide precursors. To measure the degree of imidization of aliphatic polyimide precursors, a peak derived from a structure that does not change after an imidization reaction is used as an internal standard peak instead of the absorption peak derived from aromatic rings.

Porous Polyimide Film

A porous polyimide film according to this exemplary embodiment will now be described.

A porous polyimide film obtained by the method for manufacturing a porous polyimide film according to this exemplary embodiment may have reduced cracks and pinholes.

Properties of Porous Polyimide Film

The porosity of the porous polyimide film according to this exemplary embodiment may be, but not limited to, 30% or more, preferably 40% or more, more preferably 50% or more. The upper porosity limit may be, but not limited to, up to 90%.

The pores may be spherical or substantially spherical and may be joined to each other (see the FIGURE). For example, the size of the pore junctions may be 1/100 to 1/2, preferably 1/50 to 1/3, more preferably 1/20 to 1/4, the maximum size of the pores. Specifically, the average size of the pore junctions may be 5 to 1,500 nm.

The average size of the pores may be, but not limited to, 0.1 to 0.5 μm, preferably 0.25 to 0.5 μm, more preferably 0.25 to 0.48 μm, even more preferably 0.25 to 0.45 μm.

The ratio of the maximum size to the minimum size of the pores (i.e., the ratio of the maximum pore size to the minimum pore size) in the porous polyimide film according to this exemplary embodiment is 1 to 2, preferably 1 to 1.9, more preferably 1 to 1.8, where ratios closer to 1 are more preferred. A ratio within such a range may result in reduced variation in pore size. In addition, for example, the use of such a porous polyimide film according to this exemplary embodiment as a separator for a lithium-ion battery may reduce the formation of lithium dendrites because of reduced disturbance in ion flow. The ratio of the maximum size to the minimum size of the pores is expressed as the maximum size of the pores divided by the minimum size of the pores (i.e., maximum pore size/minimum pore size).

The average sizes of the pores and the pore junctions are measured by observation under a scanning electron microscope (SEM). Specifically, the porous polyimide film is first cut to prepare a sample for measurement. The sample for measurement is then observed under a VE SEM available from Keyence Corporation, and measurements are made using associated image processing software. The observations and measurements are made on 100 pores present in a sectional surface for measurement to determine the average, minimum, and maximum sizes of the pores. The size of nonspherical pores is defined as the largest size thereof.

The thickness of the porous polyimide film may be, but not limited to, 15 to 500 μm.

Applications of Porous Polyimide Film

Examples of applications of the porous polyimide film according to this exemplary embodiment include separators for batteries such as lithium-ion batteries; separators for electrolytic capacitors; electrolyte membranes for devices such as fuel cells; battery electrode materials; gas and liquid separation membranes; low-dielectric-constant materials; and filtration membranes.

As an example, the use of the porous polyimide film according to this exemplary embodiment as a battery separator may reduce the formation of lithium dendrites because of factors such as reduced variation in lithium ion flow distribution. This is probably due to reduced variation in the pore shape and size of the porous polyimide film according to this exemplary embodiment.

As another example, the use of the porous polyimide film according to this exemplary embodiment as a battery electrode material may increase the battery capacity because of increased likelihood of contact with the electrolyte. This is probably because the electrode material, such as carbon black, incorporated into the porous polyimide film is exposed over an increased area in the surfaces of the pores in the porous polyimide film and in the surface of the porous polyimide film.

As still another example, the porous polyimide film according to this exemplary embodiment may be used as an electrolyte membrane by filling the pores with an electrolyte such as an ionic gel prepared from an ionic liquid. The method of manufacture according to this exemplary embodiment may simplify the manufacturing process and may thus provide an electrolyte membrane at a lower cost.

EXAMPLES

Examples will now be described, although these examples are not intended to limit the present invention in any way. In the description below, all parts and percentages are by mass unless otherwise specified.

Preparation of Resin Particle Dispersion

Preparation of Resin Particle Dispersion (1)

A monomer emulsion is prepared by mixing together 770 parts by mass of styrene, 230 parts by mass of butyl acrylate, 20 parts by mass of acrylic acid, 25.0 parts by mass of the surfactant DOWFAX 2A1 (47% solution, available from the Dow Chemical Company), and 576 parts by mass of deionized water and stirring the mixture with a dissolver at 1,500 rpm for 30 minutes to perform emulsification. In a reaction vessel are then placed 1.10 parts by mass of DOWFAX 2A1 (47% solution, available from the Dow Chemical Company) and 1,270 parts by mass of deionized water. After the solution is heated to 75° C. under a nitrogen stream, 75 parts by mass of the monomer emulsion is added to the solution. A polymerization initiator solution containing 15 parts by mass of ammonium persulfate and 98 parts by mass of deionized water is then added dropwise over 10 minutes. After the addition, the mixture is reacted for 50 minutes. The remaining monomer emulsion is then added dropwise over 220 minutes and is reacted for additional 180 minutes, followed by cooling to obtain Resin Particle Dispersion (1), which is a dispersion of styrene-acrylic resin particles having surface acidic groups. Resin Particle Dispersion (1) has a solid content of 34.4% by mass. The resin particles have an average particle size of 0.39 μm. The average particle size of the resin particles is the volume average particle size measured by the method described above (the same applies hereinafter). The results are summarized in Table 1.

Preparation of Resin Particle Dispersions (2) and (3)

Resin Particle Dispersion (2) is prepared by the same procedure as Resin Particle Dispersion (1) except that 20 parts by mass of acrylic acid is replaced with 50 parts by mass of acrylic acid. Resin Particle Dispersion (3) is also prepared by the same procedure as Resin Particle Dispersion (1) except that 20 parts by mass of acrylic acid is replaced with 100 parts by mass of acrylic acid. For Resin Particle Dispersion (3), about 5 parts by mass of deposited (precipitated) resin is found on the stirring impeller. The results are summarized in Table 1.

Preparation of Resin Particle Dispersion (4)

A monomer emulsion is prepared by mixing together 770 parts by mass of styrene, 230 parts by mass of butyl acrylate, 25.0 parts by mass of the surfactant DOWFAX 2A1 (47% solution, available from the Dow Chemical Company), and 576 parts by mass of deionized water and stirring the mixture with a dissolver at 1,500 rpm for 30 minutes to perform emulsification. In a reaction vessel are then placed 1.10 parts by mass of DOWFAX 2A1 (47% solution, available from the Dow Chemical Company) and 1,270 parts by mass of deionized water. After the solution is heated to 75° C. under a nitrogen stream, 75 parts by mass of the monomer emulsion is added to the solution. A polymerization initiator solution containing 15 parts by mass of ammonium persulfate and 98 parts by mass of deionized water is then added dropwise over 10 minutes. After the addition, the mixture is reacted for 50 minutes. The remaining monomer emulsion is then added dropwise over 220 minutes and is reacted for additional 50 minutes. A liquid mixture of 5 parts by mass of maleic acid and 10 parts by mass of deionized water is then added dropwise over 5 minutes and is reacted for 150 minutes, followed by cooling to obtain Resin Particle Dispersion (4), which is a dispersion of styrene-acrylic resin particles having surface acidic groups. Resin Particle Dispersion (4) has a solid content of 34.0% by mass. The resin particles have an average particle size of 0.40 μm. The results are summarized in Table 1.

Preparation of Resin Particle Dispersions (5) and (6)

Resin Particle Dispersion (5) is prepared by the same procedure as Resin Particle Dispersion (4) except that 5 parts by mass of maleic acid is replaced with 20 parts by mass of maleic acid. Resin Particle Dispersion (6) is also prepared by the same procedure as Resin Particle Dispersion (4) except that 5 parts by mass of maleic acid is replaced with 50 parts by mass of maleic acid. For Resin Particle Dispersion (6), about 5 parts by mass of deposited (precipitated) resin is found on the stirring impeller. The results are summarized in Table 1.

Preparation of Resin Particle Dispersion (7)

A monomer emulsion is prepared by mixing together 670 parts by mass of methyl methacrylate, 25.0 parts by mass of the surfactant DOWFAX 2A1 (47% solution, available from the Dow Chemical Company), and 670 parts by mass of deionized water and stirring the mixture with a dissolver at 1,500 rpm for 30 minutes to perform emulsification. In a reaction vessel are then placed 1.10 parts by mass of DOWFAX 2A1 (47% solution, available from the Dow Chemical Company) and 1,500 parts by mass of deionized water. After the solution is heated to 75° C. under a nitrogen stream, 75 parts by mass of the monomer emulsion is added to the solution. A polymerization initiator solution containing 15 parts by mass of ammonium persulfate and 98 parts by mass of deionized water is then added dropwise over 10 minutes. After the addition, the mixture is reacted for 50 minutes. The remaining monomer emulsion is then added dropwise over 220 minutes and is reacted for additional 50 minutes. A liquid mixture of 5 parts by mass of methacrylic acid and 10 parts by mass of deionized water is then added dropwise over 5 minutes and is reacted for 150 minutes, followed by cooling to obtain Resin Particle Dispersion (7), which is a dispersion of methacrylic resin particles having surface acidic groups. Resin Particle Dispersion (7) has a solid content of 22.8% by mass. The resin particles have an average particle size of 0.28 μm. The results are summarized in Table 1.

Preparation of Resin Particle Dispersion (8)

A monomer emulsion is prepared by mixing together 670 parts by mass of styrene, 25.0 parts by mass of the surfactant DOWFAX 2A1 (47% solution, available from the Dow Chemical Company), and 670 parts by mass of deionized water and stirring the mixture with a dissolver at 1,500 rpm for 30 minutes to perform emulsification. In a reaction vessel are then placed 1.10 parts by mass of DOWFAX 2A1 (47% solution, available from the Dow Chemical Company) and 1,500 parts by mass of deionized water. After the solution is heated to 75° C. under a nitrogen stream, 75 parts by mass of the monomer emulsion is added to the solution. A polymerization initiator solution containing 15 parts by mass of ammonium persulfate and 98 parts by mass of deionized water is then added dropwise over 10 minutes. After the addition, the mixture is reacted for 50 minutes. The remaining monomer emulsion is then added dropwise over 220 minutes and is reacted for additional 50 minutes. A liquid mixture of 5 parts by mass of sodium 4-vinylbenzenesulfonate (abbreviated as VBS) and 10 parts by mass of deionized water is then added dropwise over 5 minutes and is reacted for 150 minutes, followed by cooling to obtain Resin Particle Dispersion (8), which is a dispersion of styrene resin particles having surface acidic groups. Resin Particle Dispersion (8) has a solid content of 22.8% by mass. The resin particles have an average particle size of 0.28 μm. The results are summarized in Table 1.

Preparation of Comparative Resin Particle Dispersion (9)

Comparative Resin Particle Dispersion (9) is prepared by the same procedure as Resin Particle Dispersion (1) except that 20 parts by mass of acrylic acid is omitted. The results are summarized in Table 1.

Preparation of Comparative Resin Particle Dispersion (10)

Comparative Resin Particle Dispersion (10) is prepared by the same procedure as Resin Particle Dispersion (7) except that the liquid mixture of 5 parts by mass of methacrylic acid and 10 parts by mass of deionized water is omitted. The results are summarized in Table 1.

Preparation of Comparative Resin Particle Dispersion (11)

Comparative Resin Particle Dispersion (11) is prepared by the same procedure as Resin Particle Dispersion (8) except that the liquid mixture of 5 parts by mass of sodium vinylbenzenesulfonate and 10 parts by mass of deionized water is omitted. The results are summarized in Table 1.

Preparation of Comparative Resin Particle Dispersion (12)

Comparative Resin Particle Dispersion (12) is prepared by the same procedure as Resin Particle Dispersion (1) except that 20 parts by mass of acrylic acid is replaced with 20 parts by mass of dimethylaminoethyl methacrylate. Comparative Resin Particle Dispersion (12) has a solid content of 34.4% by mass. The resin particles have an average particle size of 0.40 μm.

TABLE 1

| | | With surface acidic groups | | | | | | | | Without surface acidic groups | | | |
| | | Acid monomer mixed | | | Acid monomer added later | | | | | No acid monomer | | | |
| | | Resin Particle Dispersion No. | | | | | | | | | | | |
| | | 1 | 2 | 3 | 4 | 5 | 6 | 7 | 8 | 9 | 10 | 11 | 12 |
| Monomer composition (parts by mass) | St | 770 | 770 | 770 | 770 | 770 | 770 | | 670 | 770 | | 670 | 770 |
| | BA | 230 | 230 | 230 | 230 | 230 | 230 | | | 230 | | | 230 |
| | MMA | | | | | | | 670 | | | 670 | | |
| | AA | 20 | 50 | 100 | | | | | | | | | |
| | MA | | | | 5 | 20 | 50 | | | | | | |
| | MAA | | | | | | | 5 | | | | | |
| | VBS | | | | | | | | 5 | | | | |
| | DMAEtMA | | | | | | | | | | | | 20 |
| Amount of precipitated resin (parts by mass) | | 0 | 0 | About 5 | 0 | 0 | About 5 | 0 | 0 | 0 | 0 | 0 | 0 |
| Solid content (% by mass) | | 34.4 | 35.1 | 36.1 | 34.0 | 34.3 | 35.0 | 22.8 | 22.8 | 34.0 | 22.8 | 22.8 | 34.4 |
| Average particle size (μm) | | 0.39 | 0.40 | 0.41 | 0.40 | 0.40 | 0.41 | 0.28 | 0.28 | 0.40 | 0.28 | 0.25 | 0.40 |

The definitions of the abbreviations in Table 1 are given below:
St: styrene
BA: butyl acrylate
MMA: methyl methacrylate
AA: acrylic acid
MA: maleic acid
MAA: methacrylic acid
VBS: sodium 4-vinylbenzenesulfonate
DMAEtMA: dimethylaminoethyl methacrylate Example 1

Preparation of Resin-Particle-Dispersed Polyimide Precursor Solution (PAA-1)

To 100 g, on a solid basis, of the resin particles in Resin Particle Dispersion (1) (containing 191 g of water), 209 g of deionized water is added to adjust the solid content of the resin particle dispersion to 20% by mass. To the resin particle dispersion are added 9.59 g (88.7 mmol) of p-phenylenediamine (molecular weight=108.14) and 25.58 g (86.9 mmol) of 3,3',4,4'-biphenyltetracarboxylic dianhydride (molecular weight=294.22). The mixture is dispersed with stirring at 20° C. for 10 minutes. To the mixture is then slowly added 25.0 g (247.3 mmol) of N-methylmorpholine (organic amine compound). While the reaction temperature is maintained at 60° C., the mixture is dissolved and reacted with stirring for 24 hours to obtain Resin-Particle-Dispersed Polyimide Precursor Solution (PAA-1) (ratio of resin particles to polyimide precursor=100/35.2 (by mass), concentration of polyimide precursor in solution=about 6.6% by mass). PAA-1 thus obtained is diluted with water, and the particle size distribution is measured by the method described above. As with Resin Particle Dispersion (1), the resulting particle size distribution has a single peak with an average particle size of 0.39 μm, demonstrating that the resin particles are well dispersed. The volume particle size distribution index (GSDv) is also measured by the method described above. The results are summarized in Table 2.

Example 2

Preparation of Resin-Particle-Dispersed Polyimide Precursor Solution (PAA-2)

Resin-Particle-Dispersed Polyimide Precursor Solution (PAA-2) is prepared as in Example 1 except that 25.0 g of N-methylmorpholine (organic amine compound) is replaced with a mixture of 25.0 g of N,N'-dimethylimidazolidinone (aprotic polar solvent) and 25.0 g of N-methylmorpholine (organic amine compound). PAA-2 thus obtained is diluted with water, and the particle size distribution is measured by the method described above. The resulting particle size distribution has a single peak with an average particle size of 0.39 μm, demonstrating that the resin particles are well dispersed. The volume particle size distribution index (GSDv) is also measured by the method described above. The results are summarized in Table 2.

Examples 3 to 16

Resin-Particle-Dispersed Polyimide Precursor Solutions (PAA-3), (PAA-5), (PAA-7), (PAA-9), (PAA-11), (PAA-13), and (PAA-15) are prepared without the addition of an aprotic polar solvent as in Example 1 except that the type of resin particle dispersion, the type and amount of diamine component used for polymerization to form a polyimide precursor, and the type and amount of organic amine compound are changed as shown in Table 2. Resin-Particle-Dispersed Polyimide Precursor Solutions (PAA-4), (PAA-6), (PAA-8), (PAA-10), (PAA-12), (PAA-14), and (PAA-16) are prepared with the addition of an aprotic polar solvent as in Example 2 except that the amount of water added is adjusted so that the resulting resin particle dispersion has the same solid content as in Example 2, with the numbers of moles and the amount of solvent being identical to those in Example 2, and the type of resin particle dispersion, the type and amount of diamine component used for polymerization to form a polyimide precursor, and the type and amount of organic amine compound are changed as shown in Table 2. The particle size distribution of the resin-particle-dispersed polyimide precursor solution of each example is measured by the method described above. The volume particle size distribution index (GSDv) is also measured by the method described above. The results are summarized in Table 2.

Comparative Examples 1 to 5

Preparation of Resin-Particle-Dispersed Polyimide Precursor Solutions (PAA-R1 to PAA-R5)

Resin-Particle-Dispersed Polyimide Precursor Solutions (PAA-R1) to (PAA-R5) are prepared as in Example 2 except that Resin Particle Dispersion (1) is replaced with Resin Particle Dispersions (9) to (12). The average particle size is measured by the method described above. In Comparative Example 2, no aprotic polar solvent is added. For any of the comparative examples, two peaks are observed, including one at about 4 to 5 times the original particle size of the resin particles, demonstrating that the resin particles are aggregated. The volume particle size distribution index (GSDv) is also measured by the method described above. The results are summarized in Table 2.

TABLE 2

| | | | PI precursor | | | | Organic amine compound | | Aprotic polar solvent | | Particle size distribution of resin particles | | | |
| | | | Tetracarboxylic acid | | Diamine | | | | | | Average particle size (μm) | Number of peaks (peaks) | Proportion of peak A (%) | GSDv |
| PI precursor solution | Resin particle dispersion | | Type | Amount (g) | Type | Amount (g) | Type | Amount (g) | Type | Amount (g) | | | | |
|---|---|---|---|---|---|---|---|---|---|---|---|---|---|---|
| Ex. 1 | PAA-1 | 1 | BPDA | 25.58 | PDA | 9.59 | MMO | 25.0 | | | 0.39 | 1 | 100 | 1.15 |
| Ex. 2 | PAA-2 | 1 | BPDA | 25.58 | PDA | 9.59 | MMO | 25.0 | DMI | 25.0 | 0.39 | 1 | 100 | 1.16 |
| Ex. 3 | PAA-3 | 2 | BPDA | 25.58 | ODA | 17.76 | MMO | 25.0 | | | 0.40 | 1 | 100 | 1.15 |
| Ex. 4 | PAA-4 | 2 | BPDA | 25.58 | ODA | 17.76 | MMO | 25.0 | NMP | 25.0 | 0.40 | 1 | 100 | 1.18 |
| Ex. 5 | PAA-5 | 3 | BPDA | 25.58 | PDA | 9.59 | DMAEt | 22.05 | | | 0.41 | 1 | 100 | 1.16 |
| Ex. 6 | PAA-6 | 3 | BPDA | 25.58 | PDA | 9.59 | DMAEt | 22.05 | NMP | 25.0 | 0.41 | 1 | 100 | 1.19 |
| Ex. 7 | PAA-7 | 4 | BPDA | 25.58 | PDA | 9.59 | DMIz | 23.78 | | | 0.40 | 1 | 100 | 1.14 |
| Ex. 8 | PAA-8 | 4 | BPDA | 25.58 | PDA | 9.59 | DMIz | 23.78 | DMI | 25.0 | 0.40 | 1 | 100 | 1.15 |

TABLE 2-continued

| | PI precursor solution | Resin particle dispersion | PI precursor Tetracarboxylic acid Type | Amount (g) | Diamine Type | Amount (g) | Organic amine compound Type | Amount (g) | Aprotic polar solvent Type | Amount (g) | Particle size distribution of resin particles Average particle size (µm) | Number of peaks (peaks) | Proportion of peak A (%) | GSDv |
|---|---|---|---|---|---|---|---|---|---|---|---|---|---|---|
| Ex. 9 | PAA-9 | 5 | BPDA | 25.58 | PDA | 9.59 | MMO | 25.0 | | | 0.40 | 1 | 100 | 1.17 |
| Ex. 10 | PAA-10 | 5 | BPDA | 25.58 | PDA | 9.59 | MMO | 25.0 | DMI | 25.0 | 0.40 | 1 | 100 | 1.16 |
| Ex. 11 | PAA-11 | 6 | BPDA | 25.58 | ODA | 17.76 | MMO | 25.0 | | | 0.41 | 1 | 100 | 1.21 |
| Ex. 12 | PAA-12 | 6 | BPDA | 25.58 | ODA | 17.76 | MMO | 25.0 | NMP | 25.0 | 0.41 | 1 | 100 | 1.18 |
| Ex. 13 | PAA-13 | 7 | BPDA | 25.58 | PDA | 9.59 | DMAEt | 22.05 | | | 0.28 | 1 | 100 | 1.17 |
| Ex. 14 | PAA-14 | 7 | BPDA | 25.58 | PDA | 9.59 | DMAEt | 22.05 | NMP | 25.0 | 0.28 | 1 | 100 | 1.15 |
| Ex. 15 | PAA-15 | 8 | BPDA | 25.58 | PDA | 9.59 | DMIz | 23.78 | | | 0.29 | 2 | 92 | 1.29 |
| Ex. 16 | PAA-16 | 8 | BPDA | 25.58 | PDA | 9.59 | DMIz | 23.78 | DMI | 25.0 | 0.29 | 2 | 90 | 1.30 |
| Com. Ex. 1 | PAA-R1 | 9 | BPDA | 25.58 | PDA | 9.59 | MMO | 25.0 | DMI | 25.0 | 2.02 | 2 | 55 | 2.81 |
| Com. Ex. 2 | PAA-R2 | 9 | BPDA | 25.58 | PDA | 9.59 | MMO | 25.0 | | | 2.02 | 2 | 50 | 2.95 |
| Com. Ex. 3 | PAA-R3 | 10 | BPDA | 25.58 | PDA | 9.59 | MMO | 25.0 | DMI | 25.0 | 1.35 | 2 | 75 | 2.51 |
| Com. Ex. 4 | PAA-R4 | 11 | BPDA | 25.58 | PDA | 9.59 | MMO | 25.0 | DMI | 25.0 | 1.31 | 2 | 70 | 2.43 |
| Com. Ex. 5 | PAA-R5 | 12 | BPDA | 25.58 | PDA | 9.59 | MMO | 25.0 | DMI | 25.0 | 2.52 | 2 | 35 | 2.99 |

The definitions of the abbreviations in Table 2 are given below:
PI: polyimide
PDA: p-phenylenediamine
ODA: 4,4'-diaminodiphenyl ether
BPDA: 3,3',4,4'-biphenyltetracarboxylic dianhydride
MMO: methylmorpholine
DMAEt: dimethylaminoethanol
DMIz: 1,2-dimethylimidazole
DMI: N,N'-dimethylimidazolidinone
NMP: N-methylpyrrolidone In Table 2, the "proportion of peak A" column shows the proportion of the volume frequency of the peak having the highest volume frequency of the peaks of the volume particle size distribution of the resin particles (peak A) to the total volume frequency of all peaks of the volume particle size distribution.

The results in Table 2 show that the resin particles in the polyimide precursor solutions of the Examples have smaller volume average particle sizes than the resin particles in the polyimide precursor solutions of the Comparative Examples. The results also show that the proportion of the peak A is higher in the Examples than in the Comparative Examples. This demonstrates that the resin particles of the Examples have a better dispersibility than the resin particles of the Comparative Examples.

Example 17

Fabrication of Porous Polyimide Film (PIF-1)

A glass substrate and an aluminum substrate for the formation of a coating of a resin-particle-dispersed polyimide precursor solution are first provided. A solution of the release agent KS-700 (available from Shin-Etsu Chemical Co., Ltd.) in toluene is applied to the aluminum substrate in a 10 cm square to form a coating having a dry thickness of about 0.05 µm. The coating is then heated at 400° C. to form a release layer.

Resin-Particle-Dispersed Polyimide Precursor Solution (PAA-1) is then applied to the glass substrate and the release layer on the aluminum substrate to form a coating having a dry thickness of about 30 µm, followed by drying 90° C. for 1 hour. The coating is then heated from room temperature (25° C., the same applies hereinafter) to 400° C. at 10° C./min, is maintained at 400° C. for 1 hour, and is cooled to room temperature to obtain Porous Polyimide Film (PIF-1) having a thickness of about 25 µm.

Examples 18 to 32 and Comparative Examples 6 to 10

Porous Polyimide Films (PIF-1) to (PIF-16) and (RPIF-1) to (RPIF-5) are prepared as in Example 17 except that the resin-particle-dispersed polyimide precursor solution is replaced with those shown in Table 3.

The porous polyimide films obtained in the examples are evaluated for peeling from the substrate upon drying and firing, the presence of pinholes, and air permeation rate (air permeation speed) by the following evaluation methods. The results are summarized in Table 3.

Evaluation for Peeling from Substrate

The coatings of each resin-particle-dispersed polyimide precursor solution on the glass and aluminum substrates are visually evaluated for peeling from the substrates upon drying and firing (peeling would lead to cracking of the porous polyimide film and would also decrease its smoothness). Coatings with a rating of C are not subjected to the evaluations for pinholes and air permeation rate described below.

Rating Scale
A: no peeling
B: peeling at one to three sites
C: peeling at more than three sites and over the entire surface Evaluation for Pinholes A sample is taken from the porous polyimide film obtained in each example and is visually inspected in a 1 cm square for the number of pinholes extending from the front surface to the back surface.

Samples with a rating of B tend to be unsuitable for practical use depending on the application (e.g., for applications requiring large areas, such as separators). Samples with a rating of C are particularly unsuitable for practical use.

Rating Scale
A: no crack
B: one to three cracks
C: four or more cracks

Evaluation for Air Permeation Speed

Each resulting porous polyimide film is cut to a 1 cm square to obtain a sample for air permeation speed measurement. The sample is set between the funnel and base of a filter holder for vacuum filtration (KGS-04, available from Advantec). The filter holder equipped with the sample is immersed upside down in water to fill the funnel with water to a predetermined level. An air pressure of 0.5 atmosphere (0.05 MPa) is placed on the side of the base that is not in contact with the funnel. The time (seconds) required for 50 mL of air to pass through the sample is measured and evaluated as air permeation speed.

The measurements on samples with pinhole ratings of B and C are made in pinhole-free areas.

TABLE 3

| Examples | PI precursor solution | Porous PI film | Substrate | Peeling from substrate | Pinholes | Air permeation speed (seconds) |
|---|---|---|---|---|---|---|
| Example 17 | PAA-1 | PIF-1 | Glass substrate | A | A | 25 |
|  |  |  | Aluminum substrate | C | — | — |
| Example 18 | PAA-2 | PIF-2 | Glass substrate | A | A | 25 |
|  |  |  | Aluminum substrate | A | A | 26 |
| Example 19 | PAA-3 | PIF-3 | Glass substrate | A | A | 22 |
|  |  |  | Aluminum substrate | C | — | — |
| Example 20 | PAA-4 | PIF-4 | Glass substrate | A | A | 22 |
|  |  |  | Aluminum substrate | A | A | 22 |
| Example 21 | PAA-5 | PIF-5 | Glass substrate | A | A | 20 |
|  |  |  | Aluminum substrate | C | — | — |
| Example 22 | PAA-6 | PIF-6 | Glass substrate | A | A | 19 |
|  |  |  | Aluminum substrate | A | A | 19 |
| Example 23 | PAA-7 | PIF-7 | Glass substrate | A | A | 21 |
|  |  |  | Aluminum substrate | C | — | — |
| Example 24 | PAA-8 | PIF-8 | Glass substrate | A | A | 21 |
|  |  |  | Aluminum substrate | A | A | 20 |
| Example 25 | PAA-9 | PIF-9 | Glass substrate | A | A | 22 |
|  |  |  | Aluminum substrate | C | — | — |
| Example 26 | PAA-10 | PIF-10 | Glass substrate | A | A | 21 |
|  |  |  | Aluminum substrate | A | A | 21 |
| Example 27 | PAA-11 | PIF-11 | Glass substrate | A | A | 20 |
|  |  |  | Aluminum substrate | C | — | — |
| Example 28 | PAA-12 | PIF-12 | Glass substrate | A | A | 19 |
|  |  |  | Aluminum substrate | A | A | 19 |
| Example 29 | PAA-13 | PIF-13 | Glass substrate | A | A | 33 |
|  |  |  | Aluminum substrate | C | — | — |
| Example 30 | PAA-14 | PIF-14 | Glass substrate | A | A | 31 |
|  |  |  | Aluminum substrate | A | A | 31 |
| Example 31 | PAA-15 | PIF-15 | Glass substrate | A | A | 37 |
|  |  |  | Aluminum substrate | C | — | — |
| Example 32 | PAA-16 | PIF-16 | Glass substrate | A | B | 30 |
|  |  |  | Aluminum substrate | A | A | 32 |
| Comparative Example 6 | PAA-R1 | RPIF-1 | Glass substrate | A | C | 22 |
|  |  |  | Aluminum substrate | A | C | 21 |
| Comparative Example 7 | PAA-R2 | RPIF-2 | Glass substrate | A | C | 23 |
|  |  |  | Aluminum substrate | C | — | — |
| Comparative Example 8 | PAA-R3 | RPIF-3 | Glass substrate | A | C | 30 |
|  |  |  | Aluminum substrate | A | C | 30 |
| Comparative Example 9 | PAA-R4 | RPIF-4 | Glass substrate | A | C | 36 |
|  |  |  | Aluminum substrate | A | C | 37 |
| Comparative Example 10 | PAA-R5 | RPIF-5 | Glass substrate | A | C | 30 |
|  |  |  | Aluminum substrate | A | C | 31 |

The above results demonstrate that the Examples have better pinhole ratings than the Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor solution comprising:
   resin particles having surface acidic groups;
   an aqueous solvent comprising water; and
   a polyimide precursor, wherein
   the resin particles are formed of a resin selected from the group consisting of polyester resins, urethane resins, vinyl resins, olefin resins, and fluorocarbon resins.

2. The polyimide precursor solution according to claim 1, wherein the resin particles in the polyimide precursor solution have a volume particle size distribution with one or more peaks, and the volume frequency of a peak having the highest volume frequency of the one or more peaks accounts for 90% to 100% of the total volume frequency of all peaks of the volume particle size distribution.

3. The polyimide precursor solution according to claim 2, wherein the resin particles in the polyimide precursor solution have a volume particle size distribution index of 1.30 or less.

4. The polyimide precursor solution according to claim 1, wherein the acidic groups are at least one type of acidic group selected from the group consisting of carboxy, sulfo, and phenolic hydroxy groups.

5. The polyimide precursor solution according to claim 1, wherein the resin particles have an average particle size of 0.1 to 0.5 μm.

6. The polyimide precursor solution according to claim 1, wherein the resin particles are present in an amount of 20 to 600 parts by mass based on 100 parts by mass, on a solid basis, of the polyimide precursor.

7. The polyimide precursor solution according to claim 1, wherein water is present in the aqueous solvent in an amount of 50% to 100% by mass based on the total mass of the aqueous solvent.

8. The polyimide precursor solution according to claim 1, further comprising an organic amine compound.

9. The polyimide precursor solution according to claim 8, wherein the organic amine compound is a tertiary amine compound.

10. The polyimide precursor solution according to claim 8, wherein the organic amine compound is an amine compound having a nitrogen-containing heterocyclic structure.

11. The polyimide precursor solution according to claim 1, further comprising an aprotic polar solvent in an amount of 5% to 300% by mass based on the mass, on a solid basis, of the polyimide precursor in the polyimide precursor solution.

12. A polyimide film obtained by applying the polyimide precursor solution according to claim 1 to form a coating and heating the coating.

13. The polyimide film according to claim 12, wherein the polyimide film is further subjected to resin particle removal treatment.

14. The polyimide film according to claim 13, wherein the resin particle removal treatment is performed by heating the resin particles or dissolving the resin particles in an organic solvent.

15. The polyimide film according to claim 13, wherein the polyimide film is further subjected to resin particle exposure treatment before the resin particle removal treatment.

16. The polyimide precursor solution according to claim 1, wherein the resin forming the resin particles is selected from the group consisting of (meth)acrylic resins, (meth)acrylate resins, styrene-(meth)acrylic resins, and polystyrene resins.

17. The polyimide precursor solution according to claim 1, wherein the polyimide precursor has not been imidized.

18. The polyimide precursor solution according to claim 1, wherein the surface acidic groups are functional groups of repeating units of the resin, and the functional groups are independently selected from the group consisting of a carboxy group, a sulfo group, and a phenolic hydroxy group.

* * * * *